United States Patent
Chuang et al.

(10) Patent No.: US 10,323,115 B2
(45) Date of Patent: *Jun. 18, 2019

(54) BIO-POLYOL COMPOSITION AND BIO-POLYURETHANE FOAM

(71) Applicant: Industrial Technology Research Institute, Hsinchu (TW)

(72) Inventors: Wen-Pin Chuang, Hsinchu (TW); Yi-Che Su, Hsinchu County (TW); Yun-Ya Huang, Hsinchu (TW); Yuung-Ching Sheen, Hsinchu County (TW); Chao-Chieh Chiang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 186 days.

This patent is subject to a terminal disclaimer.

(21) Appl. No.: 15/273,724

(22) Filed: Sep. 23, 2016

(65) Prior Publication Data
US 2017/0158802 A1 Jun. 8, 2017

(30) Foreign Application Priority Data
Dec. 7, 2015 (TW) .............................. 104140904 A

(51) Int. Cl.
| | |
|---|---|
| C08G 18/08 | (2006.01) |
| C08G 18/16 | (2006.01) |
| C08G 18/48 | (2006.01) |
| C08G 18/76 | (2006.01) |
| C08J 9/00 | (2006.01) |
| C08G 18/64 | (2006.01) |
| C08G 18/40 | (2006.01) |
| C08G 101/00 | (2006.01) |

(52) U.S. Cl.
CPC ......... *C08G 18/14* (2013.01); *C08G 18/0871* (2013.01); *C08G 18/165* (2013.01); *C08G 18/4081* (2013.01); *C08G 18/4825* (2013.01); *C08G 18/6492* (2013.01); *C08G 18/7664* (2013.01); *C08J 9/0061* (2013.01); *C08G 2101/0083* (2013.01); *C08J 2205/044* (2013.01); *C08J 2375/08* (2013.01); *C08J 2497/00* (2013.01)

(58) Field of Classification Search
CPC .. C08G 18/0871; C08G 18/14; C08G 18/165; C08G 18/4081; C08G 18/4825; C08G 18/6492; C08G 18/7664; C08G 2101/0083; C08J 9/0061; C08J 2205/044; C08J 2375/08; C08J 2497/00
See application file for complete search history.

(56) References Cited

U.S. PATENT DOCUMENTS

| | | | |
|---|---|---|---|
| 4,017,474 A * | 4/1977 | Glasser .............. | C08G 18/6492 521/172 |
| 4,987,213 A | 1/1991 | Hirose et al. | |
| 8,765,828 B2 | 7/2014 | Casati et al. | |
| 2005/0014919 A1 | 1/2005 | Hatakeyama et al. | |
| 2010/0068166 A1 | 3/2010 | Fowler | |
| 2010/0286298 A1 | 11/2010 | Casati et al. | |
| 2012/0202907 A1* | 8/2012 | Kurple .................. | C08L 97/005 521/170 |
| 2014/0272374 A1 | 9/2014 | Jacobmeier et al. | |
| 2015/0183948 A1 | 7/2015 | Chuang et al. | |

FOREIGN PATENT DOCUMENTS

| | | |
|---|---|---|
| CN | 101696261 | 4/2010 |
| CN | 102206320 | 10/2011 |
| CN | 102585142 | 7/2012 |
| CN | 102675582 | 9/2012 |
| CN | 103342818 | 10/2013 |
| CN | 103665300 | 3/2014 |

(Continued)

OTHER PUBLICATIONS

Pan et al., "Effect of replacing polyol by organosolv and kraft lignin on the property and structure of rigid polyurethane foam", Biotechnology for Biofuels, Jan. 28, 2013, pp. 1-10.
Spender et al., "Method for Production of Polymer and Carbon Nanofibers from Water-Soluble Polymers", Nano letters, Jun. 20, 2012, pp. 3857-3860.
Askvik et al., "Complexation between lignosulfonates and cationic surfactants and its influence on emulsion and foam stability", Colloids and Surfaces A: Physicochemical and Engineering Aspects, Nov. 30, 1999, pp. 89-101.

(Continued)

*Primary Examiner* — John M Cooney
(74) *Attorney, Agent, or Firm* — JCIPRNET

(57) ABSTRACT

A bio-polyol composition and a bio-polyurethane foam are provided. The bio-polyol composition includes polyol, a surface-modified lignin, and a surfactant represented by formula 1.

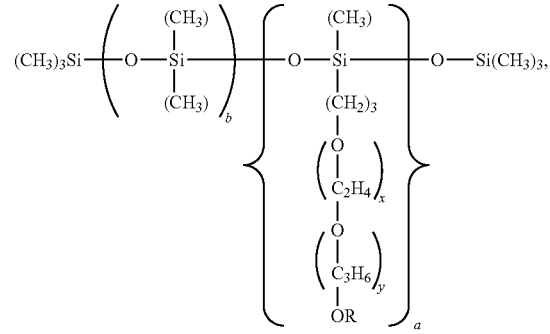

formula 1 wherein R is represented by $C_nH_{2n+1}$, n is an integer of 0 to 3; x/y is between 5 and 13; a is an integer of 1 to 100; b is an integer of 1 to 100.

7 Claims, No Drawings

(56) References Cited

FOREIGN PATENT DOCUMENTS

| | | | |
|---|---|---|---|
| CN | 104744659 | 7/2015 | |
| TW | I419906 | 12/2013 | |
| TW | 201525028 | 7/2015 | |
| WO | WO-2013179251 A1 * | 12/2013 | ............ C08L 97/005 |
| WO | WO-2014044234 A1 * | 3/2014 | ............... C07G 1/00 |

OTHER PUBLICATIONS

Chung et al., "Improved Lignin Polyurethane Properties with Lewis Acid Treatment", Applied materials & Interface, May 10, 2012, pp. 2840-2846.

Cateto et al., "Optimization Study of Lignin Oxypropylation in View of the Preparation of Polyurethane Rigid Foams", Ind. Eng. Chem. Res, Feb. 2, 2009, pp. 2583-2589.

Nadji et al., "Oxypropylation of Lignins and Preparation of Rigid Polyurethane Foams from the Ensuing Polyols," Macromol. Mater. Eng, Oct. 2005, pp. 1009-1016.

"Office Action of Taiwan Counterpart Application", dated May 13, 2016, p. 1-p. 8.

"Office Action of China Counterpart Application," dated Jan. 17, 2019, pp. 1-8.

* cited by examiner

BIO-POLYOL COMPOSITION AND BIO-POLYURETHANE FOAM

CROSS-REFERENCE TO RELATED APPLICATION

This application claims the priority benefit of Taiwan application serial no. 104140904, filed on Dec. 7, 2015. The entirety of the above-mentioned patent application is hereby incorporated by reference herein and made a part of this specification.

TECHNICAL FIELD

The disclosure relates to a bio-polyol composition and a bio-polyurethane foam.

BACKGROUND

Due to concerns of insufficient petroleum raw material storage and supply, issues of rocketed petrochemical prices and insufficient petrochemical raw material sources are becoming worse, and in the production, use, and waste management of petrochemical products, large amounts of pollutants are produced, thus causing many environmental issues. Therefore, advanced nations of the world all list plant-based biomaterials as an important development project and an important key industrial raw material for replacing petrochemical raw materials in the future. In nature, the lignin reserves are only second to cellulose, and globally about 50 billion tons are produced each year. Lignin is abundant and cheap and has great business potential, and lignin has polyaromatic ring structure mechanical properties and good chemical resistance, and is therefore very suitable for the development of bio-composite materials. However, the application of internationally-developed biomaterials (such as lignin) in polymer composite materials is still very limited, mainly due to a large number of —OH functional groups and benzene ring structures of the lignin and strong intermolecular forces (such as hydrogen bonding) and π-π attraction force, such that lignin is not readily dispersed in a polymer substrate, and as a result a greater amount thereof causes worse mechanical properties. Only the uniform dispersion of lignin in a polymer substrate can effectively increase the mechanical properties of the bio-composite material and reduce the cost, and therefore the mixing and dispersion of lignin and the modification technique thereof have become one of the most important techniques to be established in domestic industry.

Currently, the development of lignin application in a polymer composite material is still very limited. If lignin is directly mixed with polyol for foaming, then since the dispersibility and the stability of lignin in polyurethane (PU) are poor, a greater amount thereof causes worse compressive strength. For the sulfonate lignin, after a lignin is modified via an ion exchange method, the lignin can be dissolved in polyol for foaming. However, modifying a lignin via an ion exchange method significantly increases the cost of the lignin. Therefore, the technique is greatly limited.

SUMMARY

The disclosure provides a bio-polyol composition containing a surfactant having a specific chemical structure.

The disclosure provides a bio-polyurethane foam containing the bio-polyol composition.

The bio-polyol composition of the disclosure includes polyol, a surface-modified lignin, and a surfactant represented by formula 1.

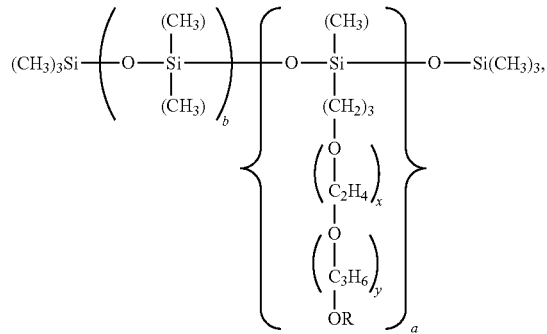

formula 1 wherein R is represented by $C_nH_{2n+1}$, n is an integer of 0 to 3; x/y is between 5 and 13; a is an integer of 1 to 100; b is an integer of 1 to 100.

The bio-polyurethane foam of the disclosure is a reaction product of a foam composition, and the foam composition includes the bio-polyol composition.

Several exemplary embodiments accompanied with figures are described in detail below to further describe the disclosure in details.

DETAILED DESCRIPTION OF DISCLOSED EMBODIMENTS

The bio-polyol composition of an embodiment of the disclosure includes polyol, a surface-modified lignin, and a surfactant. The bio-polyol composition can form a bio-polyurethane foam, and can have a foaming ratio about above 20 as a thermal insulating material. Each component of the bio-polyol composition of an embodiment of the disclosure is respectively described in detail below.

The polyol of an embodiment of the disclosure is, for instance, diol, triol, tetraol, or a combination thereof, and examples thereof can include glycol, polypropylene glycol, dipropylene glycol, glycerin.

The surface-modified lignin of an embodiment of the disclosure is uniformly dispersed in the polyol. The surface-modified lignin can mainly be formed via two methods. The first method includes forming the surface-modified lignin by covering the surface of a lignin with a modifier or adsorbing the modifier to the surface of the lignin. The lignin is, for instance, sulfonate lignin, alkali lignin, or a combination thereof. The modifier includes, for instance, alcohol, an epoxy resin, or a combination thereof having a hydroxyl group or an epoxy group. Examples of the modifier include, for instance, polyol, including ethylene glycol, polypropylene glycol (PPG), dipropylene glycol (DPG), glycerol, or a combination thereof. Using diol as an example, the two ends of the molecules thereof both have a hydroxyl group, and therefore the —OH group at one end can be attached to the lignin surface to increase the dispersibility of the lignin, and the —OH group at the other end can be subsequently reacted to form a foam.

The second method of forming the surface-modified lignin of an embodiment of the disclosure includes covering the surface of lignin using a modifier by mixing lignin and the modifier via a grinding and dispersing process to obtain the surface-modified lignin. The lignin and the modifier are as described above and are not repeated herein. Via the grinding and dispersing process, the particle size of the lignin can be reduced and the modifier can effectively cover the surface of the lignin at the same time so that the surface energy of the lignin can be reduced. The surface energy of the surface-modified lignin can be, for instance, between 25 mJ/m² and 70 mJ/m².

In an embodiment of the disclosure, the particle size of the surface-modified lignin can be between 1 μm and 100 μm, such as between 10 μm and 60 μm, or between, for instance, 10 μm and 30 μm. If the particle size exceeds 100 μm, then the lignin is readily aggregate. Moreover, if the particle size is less than 1 μm, then the viscosity of the lignin is too high such that the issue of uneven mixing occurs in the subsequent forming of a foam. The grinding and dispersing treatment can be a bead mill treatment, a milling treatment, or a combination thereof. The duration of the grinding and dispersing treatment can be between 5 minutes and 240 minutes. If the grinding time exceeds 240 minutes, then the particle size of the lignin is too small. Moreover, if the grinding time is less than 5 minutes, then the particle size of the lignin is too large.

The solubility of the surface-modified lignin of an embodiment of the disclosure is, for instance, between 15 $J^{0.5}/cm^{1.5}$ and 40 $J^{0.5}/cm^{1.5}$, and the particle size thereof is, for instance, between 1 μm and 100 μm. Moreover, in the bio-polyol composition of an embodiment of the disclosure, the weight ratio of polyol to the surface-modified lignin is, for instance, between 1:1 and 100:1, such as between 1:1 and 10:1, or between, for instance, 1:1 and 2:1.

The surfactant of an embodiment of the disclosure has the structure shown in formula 1,

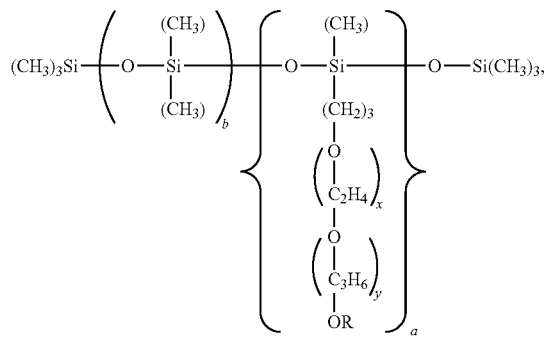

formula 1 wherein R is represented by $C_nH_{2n+1}$, n is an integer of 0 to 3; x/y is between 5 and 13; a is an integer of 1 to 100; b is an integer of 1 to 100. In the bio-polyol composition of an embodiment of the disclosure, the weight ratio of the polyol and the surfactant is, for instance, between 10:1 and 1000:1. By adjusting the value of x/y, the foam body of the foam can be stable, and the size and uniformity of the aperture of the cell can be controlled, such that the bio-polyurethane foam formed by the bio-polyol composition of an embodiment of the disclosure can have a relatively high foaming ratio (such as above 20), and the aperture of the cell can be controlled to be between 400 μm and 2100 μm (such as between 400 μm and 600 μm), and the foam can have good compressive strength and low thermal conductivity as a thermal insulating material. If the value of x/y is less than 5, then the foaming ratio is too low, such that the resulting foaming material cannot have good thermal insulating effect.

In an embodiment of the disclosure, the bio-polyol composition includes 100 parts by weight of polyol, 50 parts by weight to 100 parts by weight of the surface-modified lignin, and 0.1 parts by weight to 10 parts by weight of a surfactant.

In an embodiment of the disclosure, the bio-polyol composition can form a foam composition with diisocyanate, and a foaming treatment is performed on the foam composition to form the bio-polyurethane foam of an embodiment of the disclosure. The foaming treatment is, for instance, mechanical foaming, physical foaming, chemical foaming, or supercritical foaming. In the foam composition, the weight ratio of the bio-polyol composition to the diisocyanate is, for instance, between 0.5:1 and 2:1. The diisocyanate is, for instance, aliphatic diisocyanate, aromatic diisocyanate, or a combination thereof. With different foaming treatments, the foam composition can further contain, for instance, a foaming agent or a catalyst. In the foam composition, the weight ratio of the bio-polyol composition to the catalyst is, for instance, between 10:1 and 10000:1, and the weight ratio of the bio-polyol composition to the foaming agent is, for instance, between 1:1 and 1000:1, or between, for instance, 1:1 and 100:1. The catalyst is, for instance, a metal salt catalyst, an amine catalyst, or a combination thereof. The foaming agent is, for instance, water, cyclopentane, dichloromethane, acetone, methyl ethyl ketone, n-hexane, n-pentane, or a combination thereof.

The bio-polyurethane foam formed by the foaming treatment of an embodiment of the disclosure contains the surface-modified lignin and the surfactant represented by formula 1. The particle size of the surface-modified lignin can be between 1 μm and 100 μm, such as between 10 μm and 60 μm, or between, for instance, 10 μm and 30 μm. Based on a total weight of the bio-polyurethane foam, the amount of the surface-modified lignin is, for instance, between 5% and 30%.

In the following, the characteristics of the bio-polyol composition of the disclosure and the bio-polyurethane foam formed thereby are described with example 1 to example 4 and comparative example 1 to comparative example 3. The resulting foam is tested for compressive strength, foaming ratio, and thermal conductivity, and the results are shown in Table 1.

Example 1

45 g of alkali-soluble lignin was added in 82.1 g of polypropylene glycol (PPG400), and after dispersing using a grinding and dispersing machine for 30 minutes, 2.4 g of surfactant A (having the structure represented by formula 1, x/y=12.02), 0.11 g of a catalyst (mixture of tin catalyst and amine catalyst), and 4 g of a foaming agent (water) were added, and the components were uniformly mixed. Next, 137 g of polymeric methylene diphenyl diisocyanate (PMDI) was added to perform foaming.

Example 2

Except that surfactant B (having the structure represented by formula 1, x/y=8.98) was used to replace surfactant A, the same production method as example 1 was used.

Example 3

Except that surfactant C (having the structure represented by formula 1, x/y=5.64) was used to replace surfactant A, the same production method as example 1 was used.

Example 4

Except that surfactant D (having the structure represented by formula 1, x/y=5.37) was used to replace surfactant A, the same production method as example 1 was used.

Comparative Example 1

Except that 127.1 g of PPG400 was used and no lignin was added, the same production method as example 1 was used.

Comparative Example 2

Except that surfactant F (having the structure represented by formula 1, x/y=2.74) was used to replace surfactant A, the same production method as example 1 was used.

Comparative Example 3

Except that surfactant G (having the structure represented by formula 1, x/y=2.14) was used to replace surfactant A, the same production method as example 1 was used.

TABLE 1

| | Aperture of cell (μm) | Foaming ratio | Compressive strength (kgf/cm²) | Thermal conductivity (W/mK) |
|---|---|---|---|---|
| Example 1 | 400 to 600 | 20.48 | 2.15 | 0.032 |
| Example 2 | 450 to 600 | 20.38 | 2.04 | 0.032 |
| Example 3 | 1500 to 1800 | 20.96 | 1.35 | 0.037 |
| Example 4 | 900 to 2100 | 20.37 | 1.38 | 0.036 |
| Comparative example 1 | 400 to 600 | 22.08 | 1.59 | 0.03 |
| Comparative example 2 | 400 to 600 | 7.65 | 4.64 | 0.048 |
| Comparative example 3 | 750 to 1300 | 5.78 | — | 0.048 |

It can be clearly seen from Table 1 that:

When the foam is used as a thermal insulating material, the foaming ratio needs to be greater than 20 to lower the thermal conductivity to about 0.035 W/mK or less. Neither comparative example 2 nor comparative example 3 reach industry standard, and when compared to the foam of comparative examples 2 and 3 (value of x/y less than 5), the foam of example 1 to example 4 (value of x/y between 5 and 13) all have higher foaming ratio and lower thermal conductivity, and therefore the foam of example 1 to example 4 can have better thermal insulating effect.

Moreover, in comparison to the foam of comparative example 1 (without lignin), the foam of example 1 and example 2 (containing both lignin and the surfactant having the structure represented by formula 1) can have better compressive strength when having a closer foaming ratio.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:
1. A bio-polyol composition, comprising:
   a polyol;
   a surface-modified lignin; and
   a surfactant represented by formula 1

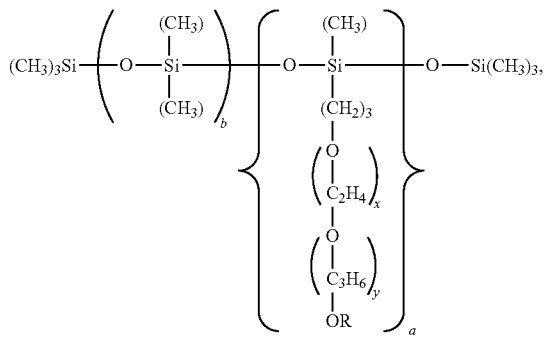

formula 1 wherein R is represented by $C_nH_{2n+1}$, n is an integer of 0 to 3; x/y is between 5 and 13; a is an integer of 1 to 100; b is an integer of 1 to 100,
wherein the surface-modified lignin is formed by covering a surface of a lignin with a modifier or adsorbing the modifier to the surface of the lignin, a particle size of the surface-modified lignin is between 10 μm and 60 μm, the lignin is selected from the group consisting of sulfonate lignin, alkali lignin, or a combination thereof, and the modifier comprises alcohol, an epoxy resin, or a combination thereof having a hydroxyl group or an epoxy group.

2. The bio-polyol composition of claim 1, wherein the polyol comprises diol, triol, tetraol, or a combination thereof.

3. The bio-polyol composition of claim 1, wherein a weight ratio of the polyol to the surface-modified lignin is between 1:1 and 100:1.

4. The bio-polyol composition of claim 1, wherein a solubility of the surface-modified lignin is between 15 $J^{0.5}/cm^{1.5}$ and 40 $J^{0.5}/cm^{1.5}$.

5. The bio-polyol composition of claim 1, wherein a surface energy of the surface-modified lignin is between 25 mJ/m² and 70 mJ/m².

6. The bio-polyol composition of claim 1, wherein the surface-modified lignin is obtained by mixing the lignin and the modifier via a grinding and dispersing process to cover the surface of the lignin with the modifier.

7. The bio-polyol composition of claim 1, wherein based on a total weight of the bio-polyol composition, a weight ratio of the polyol to the surfactant is between 10:1 and 1000:1.

* * * * *